United States Patent Office 3,377,300
Patented Apr. 9, 1968

3,377,300
NON-AQUEOUS BACK GUM AND WINDOW
ADHESIVE FOR ENVELOPES
Aaron P. Plummer, New York, N.Y., assignor to Stein,
Hall & Co., Inc., New York, N.Y., a corporation of
New York
No Drawing. Filed Jan. 21, 1964, Ser. No. 339,110
2 Claims. (Cl. 260—15)

ABSTRACT OF THE DISCLOSURE

A non-aqueous back gum and window adhesive for envelopes, as well as envelopes having the back seals and/or window patches bonded thereto with such adhesive, wherein the adhesive is an organic film-forming resin or base dissolved in an organic solvent system, which solvent system contains a composite plasticizer for the adhesive film-forming resin or base and also an inert filler material.

---

The present invention relates to an adhesive, and more particularly to a non-aqueous back gum and window adhesive for envelopes.

The present day use of aqueous adhesives in the envelope industry for back seals and window patches creates many problems in the production and end use of envelopes. Thus, the plasticity or flexibility of water soluble adhesives are significantly influenced by the amount of water present in the adhesive film. Generally attempts are made to maintain an optimum level of water in the adhesive film by the use of hygroscopic materials. However, these materials are extremely sensitive to ambient humidity conditions thereby giving a variation in flexibility of the film with variations in the ambient humidity. These variations produce stresses along the adhesive line and cause warping and curling of the finished envelopes both along the back seam and the window patch.

In addition to the forementioned problem there is the further problem of the effect of the water itself on the paper from which the envelope is made and, in the case of a glassine window patch, on the glassine. The water is absorbed by the paper fibers in the area of the adhesive application and causes a distortion of the paper which further adds to the curl and warpage of the finished envelope.

The curling problem is becoming more acute as the envelope industry tends to go to lighter weight papers. Also, the use of automatic filling and mailing machines heightens the need for an envelope which will lay completely flat.

The warpage and curling problem created by the present day use of aqueous envelope adhesives might be eliminated, provided an envelope adhesive could be developed which was not based upon an aqueous solvent medium and which utilized components which were water-insensitive so that the adhesive film would be relatively uneffected by changes in ambient humidity conditions. However, there are many problems encountered in the formulation of a non-aqueous envelope adhesive that can be used with the present day high speed envelope machines. Thus, the adhesive must have good machinability without stringing, webbing or throwing. The cohesiveness of a non-aqueous envelope adhesive which causes stringing and throwing on the envelope machine must be overcome. The rheology of the adhesive must be such that it flows and transfers in such a way as to produce a clean and well-defined adhesive line on the envelope with no bleeding or strike through. The non-aqueous solvents used must not cause separation of dyes, where used, from the paper fibers and cause straining. Also the adhesion must be positive and permanent.

In accordance with the present invention there is provided a non-aqueous back gum and window adhesive for envelopes which produces envelopes that lay completely flat after production and during storage under varying humidity conditions rather than develop a warped or curled configuration. The non-aqueous envelope adhesive of the present invention can be readily used on present day high speed envelope machines. The non-aqueous adhesive has good machinability and hence does not cause stringing, webbing or throwing on the envelope machine. The adhesive flows and transfers readily so as to produce a clean and well-defined adhesive line on the envelope with no bleeding or strike through. The non-aqueous solvents present in the adhesive do not cause separation of dyes from the paper fibers and do not cause staining. Furthermore, the adhesive produces an adhesive bond which is positive and permanent.

In general, the non-aqueous envelope adhesive of the invention is an organic film-forming resin or base dissolved in an organic solvent system, which solvent system contains a composite plasticizer for the adhesive film-forming resin or base and also an inert filler material.

The adhesive film-forming resin or base component is a cellulose nitrate, namely ¼ second nitrocellulose. This material has a viscosity of 4–5 seconds for a 25% solution thereof and is sold as Type RS having a nitrogen content of 11.8–12.2% and Type SS having a nitrogen content of 10.9–11.2%. Both of these types can be used in the present invention, although Type RS ¼ second nitrocellulose is preferred. Other film-forming resins, such as vinyl acetate, vinyl chloride, copolymers of the vinyl resins, synthetic rubbers, polyamides and the like, cannot be used in lieu of ¼ second nitrocellulose, because the cohesiveness of such adhesive systems causes stringing and throwing on the envelope machine. The only types of materials that could be handled without excessive stringing at the solids and viscosity requirements are other cellulose derivatives, such as ethyl cellulose and cellulose acetate. However, due to compatibility limitations, viscosity and economics, it is necessary that ¼ second nitrocellulose be used as the adhesive film-forming resin or base in the non-aqueous envelope adhesive of the invention. The ¼ second nitrocellulose component is present therein in an amount from about 10% to about 15% by weight of the composition.

The non-aqueous solvent of the adhesive is one having a low volatility and hence is slow to evaporate. The low volatility non-aqueous solvent is required to reduce the stringing of the adhesive system to a level that will not cause machinability problems. Such low volatility non-aqueous solvents have vapor pressures below 20 mm. of mercury at 20° C. The slow evaporating solvent permits the adhesive to be run on an envelope machine without an excessive increase in solids and viscosity that would lead to poor machinability. Typical of such non-aqueous low volatility solvents for ¼ second nitrocellulose are 2-ethoxyethanol sold under the tradename Cellosolve, 2-methoxyethanol sold under the tradename Methyl Cellosolve and/or diethyleneglycol ethyl ether sold under the tradename Carbitol. The low volatility non-aqueous solvent for ¼ second nitrocellulose is present in the envelope adhesive in an amount from about 30% to about 40% by weight of the composition.

In conjunction with the low volatility solvent, there is also utilized a lesser amount of medium volatility diluent in order to impart the desired machinability to the envelope adhesive. Typical of such medium volatility non-aqueous diluents are toluene and/or isopropanol. The medium volatility non-aqueous diluent is used in an amount from about 5% to about 15% by weight of the composition.

In order to obtain a positive and permanent adhesion bond, a high level of plasticizer has to be used with the ¼ second nitrocellulose component. However, the use of liquid plasticizers results in staining of the paper. It is therefore necessary in the adhesive of the invention to use a combination of liquid, solid and/or semi-solid plasticizers to obtain the proper balance of good and permanent adhesion without staining.

The liquid plasticizer for ¼ second nitrocellulose in the adhesive of the invention is a polymeric alkyd resin, such as that sold under the tradename Generez PL-5, and is present therein in an amount from about 4% to about 6% by weight of the adhesive composition. The solid and/or semi-solid plasticizers for ¼ second nitrocellulose or tackifying resins are an oil-modified alkyd resin, such as the oil-modified sebacic acid alkyd resin, such as that sold under the tradename Lewisol 28, which plasticizer is present in the non-aqueous adhesive composition in an amount from about 10% to about 15% by weight.

The remaining essential component of the non-aqueous adhesive is an inert filler which is included therein in order to reduce the penetration of the adhesive into the paper. This helps to prevent staining as well as aid in the adhesion. A typical suitable inert filler is calcium carbonate, such as the surface treated calcium carbonate sold under the tradename Surfex. Other inert fillers which can be employed include talc and clays. From about 15% to about 25% of the inert filler by weight of the composition is employed.

The non-aqueous back gum and window adhesive has a solids content in the range from about 55% to about 65% and has a viscosity in the range from about 2000 cps. to 10,000 cps. at 24° F. as measured by a Brookfield Synchrolectric viscometer at 20 r.p.m. The adhesive composition is prepared and used in the conventional manner by merely blending together the components thereof, applying the adhesive to the proper areas of the envelope blank and allowing the bonded areas to dry.

The adhesive composition of the invention and the criticality of the nature and amounts of components present therein are illustrated by the formulations set forth in Table I below wherein Examples 1-6 are comparative formulations and Example 7 is a formulation representative of the invention.

The composition of Example 2 did not contain the requisite amounts of solvent and diluent in that the amount of low volatility solvent (2-ethoxyethanol) was too low (below 30%) and the amount of medium volatility diluent (toluene and isopropanol) was too high (above 15%). The formulation of comparative Example 2 evaporated too readily on the rolls of the envelope machine and caused stringing and cottoning. Also, a rapid build-up of viscosity was encountered in the gum box.

The composition of Example 3 containing an excessive amount of ¼ second nitrocellulose film former (above 15%) and a deficient amount of plasticizer (below 7% of oil modified alkyd resin and below 10% sulfonamide-formaldehyde resin). This comparative formulation resulted in a brittle film and poor adhesion.

In the comparative formulation of Example 4 the amount of tackifying resin or plasticizer (oil modified alkyd resin) was present at an excessive level (above 12%). This caused the adhesive composition to have too much wet tack and thereby resulted in stringing on the envelope machine.

The two remaining comparative formulations 5 and 6 were lacking one of the essential components of the adhesive composition of the invention. Thus, in the formulation of Example 5 the film-forming adhesive resin was polyvinyl acetate rather than ¼ second nitrocellulose. This comparative formulation gave rise to machinability problems because of its high wet tack. In the comparative formulation of Example 6 the ethyl acetate solvent had too high a volatility. This caused the comparative formulation to be too fast drying and hence produced machinability problems.

The remaining formulation in Table I, namely Example 7, as noted above, illustrates the adhesive composition of the invention. This formulation had good machinability without stringing, webbing or throwing; it flowed and transferred readily so as to produce a clean and well-defined adhesive line on the envelope with no bleeding or strike through; it did not cause staining; the adhesion thereof was positive and permanent; and the envelopes using the formulation as a back gum and window adhesive were free of curling and warpage.

It will be appreciated that various modifications and changes may be made in the adhesive composition of the invention without departing from the spirit thereof and

TABLE I

| Components | Example No. (wt. percent) | | | | | | |
|---|---|---|---|---|---|---|---|
| | 1 | 2 | 3 | 4 | 5 | 6 | 7 |
| ¼ second nitrocellulose (Type RS) | 15 | 12 | 30 | 15 | --- | 15 | 15 |
| Polyvinyl acetate V-7 | --- | --- | --- | --- | 30 | --- | --- |
| Oil-modified sebacic acid alkyd resin (Paraplex RG-2) | 5 | 10 | 3 | 20 | --- | 5 | 10 |
| Sulfonamide-formaldehyde resin (Santolite MHP) | 10 | 12 | 7 | 5 | --- | 13 | 13 |
| Polymeric adipate resin (Generez PL-5) | 15 | 5 | 5 | 5 | 15 | 5 | 5 |
| Calcium carbonate (Surfex) | 10 | 20 | 10 | 20 | 5 | 20 | 20 |
| 2-ethoxyethanol (Cellosolve) | 30 | 15 | 40 | 30 | 40 | --- | 30 |
| Toluene | 5 | 10 | --- | --- | --- | 5 | 5 |
| Isopropanol | 10 | 16 | 5 | 5 | --- | 2 | 2 |
| Ethyl acetate | --- | --- | --- | --- | 10 | 35 | --- |
| Total | 100 | 100 | 100 | 100 | 100 | 100 | 100 |

Although all of the comparative formulations of Examples 1 through 4 contained the requisite components of the adhesive composition of the invention, they were all deficient in one or more properties because they did not contain the requisite amounts of the components necessary in the adhesive composition of the invention and hence are outside of the scope thereof.

Thus Example 1 contained an amount of liquid plasticizer (polymeric adipate resin) which is in excess of the 6% that can be employed in the adhesive of the invention. This excessive amount of liquid plasticizer in the comparative formulation of Example 1 caused the adhesive composition to stain the paper and hence make it impractical.

accordingly the invention is to be limited only within the scope of the appended claims.

What is claimed is:

1. A non-aqueous back gum and window adhesive for envelopes comprising (1) from about 10% to about 15% by weight of ¼ second nitrocellulose, (2) from about 7% to about 12% by weight of semi-solid to solid oil-modified sebacic acid alkyd resin, (3) from about 4% to about 6% by weight of a liquid adipic acid alkyd resin, (4) from about 10% to about 15% by weight of a plasticizer selected from the group consisting of semi-solid to solid sulfonamide-formaldehyde resin and a semi-solid to solid maleic alkyd-modified rosin ester, (5) from about 15% to about 25% by weight of inert filler selected from the group consisting of calcium carbonate, talc and clays, (6) from about 30% to about 40% by weight of at least one low volatility organic solvent for nitrocellulose selected from the group consisting of 2-methoxyethanol, 2-ethoxyethanol and diethyleneglycol ethyl ether, and (7) from about 5% to about 15% by weight of at least one medium volatility diluent selected from the group consisting of toluene and isopropanol.

2. A non-aqueous back gum and window adhesive for envelopes comprising (1) about 15% by weight of ¼ second nitrocellulose, (2) about 10% by weight of semi-solid to solid oil-modified sebacic acid alkyd resin, (3) about 5% by weight of a liquid adipic acid alkyd resin, (4) about 13% by weight of semi-solid to solid sulfonamide-formaldehyde resin, (5) about 20% by weight of calcium carbonate, (6) about 30% by weight of 2-ethoxy ethanol, (7) about 5% by weight of toluene and (8) about 2% by weight of isopropanol.

References Cited

UNITED STATES PATENTS

| | | | |
|---|---|---|---|
| 2,072,875 | 3/1937 | Gray | 156—514 |
| 2,824,019 | 2/1958 | Sapper | 260—15 |
| 2,838,464 | 6/1958 | Moffett et al. | 260—16 |

WILLIAM H. SHORT, *Primary Examiner.*

SAMUEL H. BLECH, *Examiner.*

E. M. WOODBERRY, *Assistant Examiner.*

UNITED STATES PATENT OFFICE
CERTIFICATE OF CORRECTION

Patent No. 3,377,300                        April 9, 1968

Aaron P. Plummer

It is certified that error appears in the above identified patent and that said Letters Patent are hereby corrected as shown below:

Column 1, line 71, "straining" should read -- staining --. Column 3, line 16, after "resin", second occurrence, insert -- sold under the tradename PARAPLEX RG-2, which is present in the adhesive composition in an amount from about 7% to about 12% by weight. The other solid and/or semi-solid plasticizer for 1/4 second nitrocellulose is a sulfonamide-formaldehyde resin, such as that sold under the tradename SONTOLITE MHP, or a maleic alkyd-modified rosin ester --.

Signed and sealed this 2nd day of September 1969.

(SEAL)
Attest:

Edward M. Fletcher, Jr.                  WILLIAM E. SCHUYLER, JR.
Attesting Officer                         Commissioner of Patents